United States Patent
Zalio

(10) Patent No.: US 8,284,883 B2
(45) Date of Patent: Oct. 9, 2012

(54) TIME REFERENCE IDENTIFICATION METHOD

(75) Inventor: Filip Zalio, Victoria (AU)

(73) Assignee: NEC Corporation, Tokyo (JP)

( * ) Notice: Subject to any disclaimer, the term of this patent is extended or adjusted under 35 U.S.C. 154(b) by 325 days.

(21) Appl. No.: 12/594,706

(22) PCT Filed: Apr. 3, 2008

(86) PCT No.: PCT/JP2008/057051
§ 371 (c)(1),
(2), (4) Date: Oct. 5, 2009

(87) PCT Pub. No.: WO2008/126882
PCT Pub. Date: Oct. 23, 2008

(65) Prior Publication Data
US 2010/0046653 A1 Feb. 25, 2010

(30) Foreign Application Priority Data

Apr. 5, 2007 (AU) ................................ 2007901835

(51) Int. Cl.
*H04L 7/00* (2006.01)
(52) U.S. Cl. ........................................ 375/354; 370/503
(58) Field of Classification Search .................. 375/354, 375/357, 365; 370/500, 503
See application file for complete search history.

(56) References Cited

U.S. PATENT DOCUMENTS

| | | | | |
|---|---|---|---|---|
| 5,533,047 A | * | 7/1996 | Mourot et al. | 375/149 |
| 5,943,326 A | * | 8/1999 | Schroderus | 370/324 |
| 5,974,080 A | * | 10/1999 | Papasakellariou | 375/149 |
| 5,978,367 A | * | 11/1999 | Kinnunen et al. | 370/337 |
| 6,424,678 B1 | * | 7/2002 | Doberstein et al. | 375/260 |
| 6,567,482 B1 | | 5/2003 | Popovic' | |
| 2002/0173286 A1 | * | 11/2002 | Lindoff et al. | 455/295 |
| 2004/0062300 A1 | * | 4/2004 | McDonough et al. | 375/150 |
| 2004/0198277 A1 | * | 10/2004 | Yuan | 455/136 |
| 2005/0130708 A1 | * | 6/2005 | Duncan Ho et al. | 455/561 |
| 2006/0209927 A1 | * | 9/2006 | Khandekar et al. | 375/146 |
| 2007/0091985 A1 | * | 4/2007 | Mesecher | 375/141 |
| 2008/0167066 A1 | * | 7/2008 | Yoon et al. | 455/550.1 |
| 2009/0156197 A1 | * | 6/2009 | Ho et al. | 455/423 |
| 2009/0257411 A1 | * | 10/2009 | Shitara | 370/336 |
| 2010/0246525 A1 | * | 9/2010 | Parts et al. | 370/329 |

FOREIGN PATENT DOCUMENTS

| | | |
|---|---|---|
| WO | 2005036836 A | 4/2005 |
| WO | 2007007620 A | 1/2007 |
| WO | 2007023810 A | 3/2007 |

OTHER PUBLICATIONS

International Search Report for PCT/JP2008/057051 mailed Jul. 15, 2008.

NTT DoCoMo. Physical Channels and Multiplexing in Evolved UTRA Downlink, 3GPP TSG RAN WG1 Ad Hoc on LTE R1-050590, Jun. 2005, pp. 1-24.

Motorola, Cell Search and Initial Acquisition for OFDM Downlink, 3GPP TSG RAN1#43 R1-051329, Nov. 2005, pp. 1-7.

(Continued)

*Primary Examiner* — Jean B Corrielus

(57) ABSTRACT

In a method of identifying a time reference in signal received from a transmitter, a replica of a synchronization sequence is generated on the basis of at least one known transmission parameter and is compared to a sequence derived from the signal received from the transmitter to identify a reference point in the signal received from the transmitter.

6 Claims, 2 Drawing Sheets

OTHER PUBLICATIONS

NTT DoCoMo et al., Cell Search Time Performance of 3-Step Cell Search Method in Multi-Cell Environment, 3GPP TSG RAN WG1 LTE Ad Hoc R1-061663, Jun. 2006, pp. 1-11.

NTT DoCoMo et al., Three-Step Cell Search Method for E-UTRA, 3GPP TSG RAN WG1 Meeting #46 R1-062095, Sep. 2006, pp. 1-4.

* cited by examiner

TIME REFERENCE IDENTIFICATION METHOD

TECHNICAL FIELD

The present invention relates to a method of performing cell timing acquisition for a mobile terminal in a cellular telecommunications network. The preferred embodiments of the invention will be described in the context of an OFDM wireless telecommunications network, however the present invention should not be considered as being limited to that exemplary implementation.

BACKGROUND ART

The initial cell timing synchronization is a critical and necessary step in decoding OFDM downlink transmissions in a OFDM mobile terminal, such as in the proposed long term evolution (LTE) standard of the 3GPP. Systems operating under this proposed standard are often termed Super3G networks.

The conventional method of acquiring the cell timing is to use a cell synchronization channel of the network. In this process, the mobile terminal knows the structure of the synchronization channel, and derives all other system parameters (for example, scrambling code and the number of used carriers) by decoding the synchronization channel. Since the synchronization channel is transmitted infrequently, the detection takes relatively long time.

DISCLOSURE OF THE INVENTION

Problem to be Solved by the Invention

It therefore would be advantageous to have a method that in certain cases would decrease the time taken to acquire cell timing by the mobile terminal.

It should be noted that the discussion of prior art herein is not an admission by the applicant that that prior art forms part of the common general knowledge in the art at the priority date of the present application.

Means for Solving the Problem

In a first aspect the present invention provides a method of identifying a time reference in signal received from a transmitter of a communications network, including: generating a replica of a synchronization sequence on the basis of at least one known transmission parameter; comparing the replica of a synchronization sequence to a sequence derived from the signal received from the transmitter to identify a reference point in the signal received from the transmitter.

The transmitter can be further configured to transmit a one or more signals on a plurality of subcarriers, and the known transmission parameters include one or more of the following transmission parameters: pilot channel symbol position; a scrambling code of the signal; and a subcarrier map of the signal.

The at least one known transmission parameter can be derived from a previous communication with the transmitter.

The method can include, generating a partial synchronization sequence replica for each subcarrier to be received; and combining the partial synchronization sequence replicas into a single synchronization sequence replica. The synchronization sequence can correspond to a predefined transmission interval.

The predefined transmission interval is preferably a transmission slot.

The step of comparing the replica of a synchronization sequence to a sequence derived from the signal received can include, combining the replica of a synchronization sequence with the sequence derived from the signal received on a sample by sample basis to determine a peak correlation value between the signals. In the event that the peak correlation value exceeds a predetermined threshold, the method can include identifying the time position of the peak as the time reference in the signal received.

In a second aspect the present invention provides a method of synchronizing a receiver with a transmitter of a communications network, including: identifying a time reference in signal received from the transmitter using a method according to an embodiment of the first aspect of the present invention; and synchronizing the receiver timing with reference to the identified time reference.

In a further aspect the present invention provides a method, in a mobile terminal communicating with communications network, including: attempting to perform synchronization with a transmitter of the communications network as described above; and in the event that synchronization fails, attempting synchronization with the transmitter using an alternative method.

The method is preferably performed upon start-up of the mobile terminal and/or when transmission parameters of the transmitter change.

In a fourth aspect the present invention provides a method, in a mobile terminal communicating with communications network, including: storing at least one known transmission parameters relating to the communications network, for use in synchronizing the mobile terminal with the communications network.

The method can further include synchronizing the mobile terminal using a method according to an embodiment of the present invention.

The transmission parameters can include one or more of the following transmission parameters: pilot channel symbol position; a scrambling code of a signal; and a subcarrier map of a signal.

In a further aspect the present invention provides a mobile terminal including a receiver, and a processing device, said processing device being configured to cause the mobile terminal to implement a method as according to an embodiment of any one of the aforementioned aspects of the present invention.

A preferred form of the present invention will now be described, by way of non-limiting example only, with reference to the accompanying drawings.

BEST MODE FOR CARRYING OUT THE INVENTION

For convenience terminology adopted by the 3GPP (3rd Generation Partnership Project) will be used throughout detailed description of this specification e.g. User Equipment and UE. However the present invention should not be considered as being limited to application in systems implemented in accordance with 3GPP standards.

The inventors have determined that in the cases when cell bandwidth mode and cell scrambling code is known a priori, it is possible to use the cell's pilot channel to perform a fast slot timing detection. Typically the bandwidth mode and scrambling code will be known a priori when the mobile terminal is already initialized for a given network provider, and the last used cell has been stored in the mobile terminal. In such case, cell timing can be made more efficient by first trying to synchronize onto this "last known" cell first, as it is likely to result in quick synchronization. If this initial attempt fails, the mobile terminal can proceed with a standard cell search process.

Figure 1:
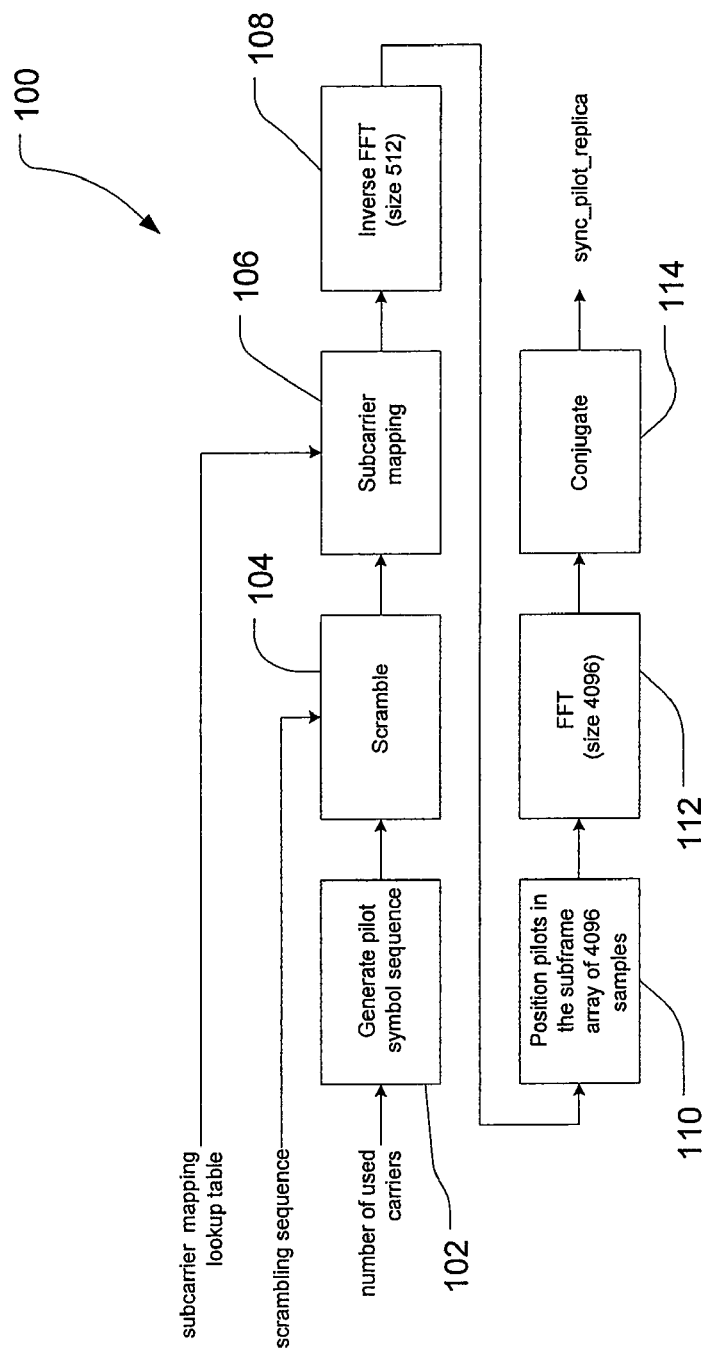
FIG. 1 illustrates a method of generating a replica synchronization signal in an embodiment of the present invention.

Cell synchronization operates by performing a cross-correlation between a received signal and a replica of that signal generated by the mobile terminal. In the preferred embodiments the structure of the replica is derived from known pilot channel symbol position, scrambling code and subcarrier map. FIG. 1 shows an example of how a replica can be generated in an embodiment of the present invention. It will be noted that the replica generation process is computationally intensive. However it only needs to be performed after start-up of the mobile terminal or whenever one of the input parameters, for example the scrambling code changes.

It is proposed that the 3GPP LTE slot will consist of 7 OFDM symbols. Some of these symbols contain so called 'pilot symbols', which consist of known carriers or 'symbols' with specified phase and amplitude at pre-defined positions in time and frequency. The replica generation device 100 on FIG. 1 converts this known time-frequency matrix of pilot symbols into time-domain waveform, then to its frequency-domain equivalent, called the sync_pilot_replica as follows. In an initial step 102 to determine which pilot symbols will be received, the number of sub-carriers being received by the mobile terminal is used to generate a pilot symbol sequence. Next, at 104 the pilot sequence is scrambled using a known scrambling sequence. In step 106 the used subcarriers are mapped according to the known subcarrier mapping look-up table. The resulting signal is converted to a time domain signal, e.g. by applying an inverse fast Fourier transform (FFT) at 108. In an exemplary embodiment, using sampling rate of 7.68 MHz, each OFDM symbol will be produced and transmitted with inverse FFT of size 512. In this case operations on individual OFDM symbols are processed with FFT size 512.

The slot is then assembled and pilot symbols are then inserted at step 110. Next the sub-frame is converted into the frequency domain, e.g. by FFT at step 112. In keeping with the example above, it should be noted that as 3GPP LIE slot is 0.5 milliseconds long, meaning that it consists of 3840 samples. As the conversion to the frequency domain is performed over whole slot an FFT size of 4096 is used, since FFT size needs to be an integer power of two.

The symbols are then conjugated in step 114 to generate the sync_pilot_replica output.

Figure 2:
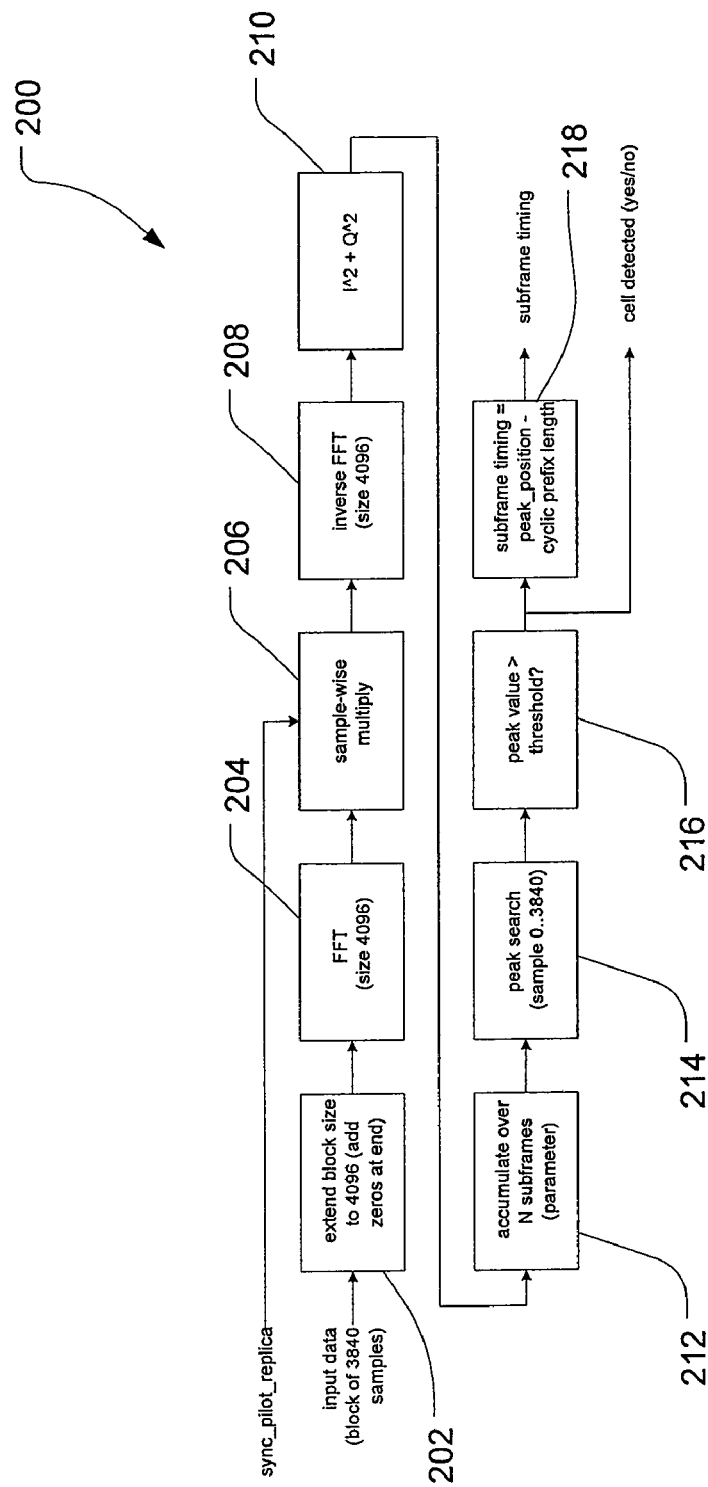
FIG. 2 illustrates a method of timing detection used in an embodiment of the present invention.

Now the sync_pilot_replica is known, timing detection can be performed in accordance with the flowchart 200 of FIG. 2.

An incoming data block, which in the example given above will includes 3840 samples, is first processed, at step 202, by extending the block to 4096 samples by padding the block with zeros, so that it is the same size as the FFT to be used. The resulting 4096 sample data block is then converted to a frequency domain signal by FFT at 204.

The frequency-domain pilot replica, sync_pilot_replica, is multiplied with the 4096 point FFT of incoming signal at 206. The result is then (in step 208) converted to time domain using an inverse FFT, of size 4096. This overall operation is mathematically equivalent to cross-correlation of the two input signals in the time domain. Next, at 210, the power of the correlation signal is determined in step 210 by calculating the sum of the squares of the I and Q components of the output of the inverse FFT step 208. So the result at the output of the $I^2+Q^2$ block is a correlation power profile.

The output of the $I^2+Q^2$ block 210 is a set of 4096 samples, which contains a sharp peak. The position of the peak within this block of samples corresponds to the position of the slot boundaries (which can be used to determine the slot timing) in the input, relative to the incoming block of 3840 samples.

The system then performs an analysis of the correlation profile and determines the actual slot timing. This analysis begins by accumulating power for each sample position over N slots in step 212. The accumulated power is then used to identify where in the slot the peak falls, in step 214. Next, in 216 the power of the identified peak is compared to a threshold level to determine if it is sufficiently strong. If the power of the peak exceeds the threshold level then a frame edge is deemed to have been identified. In this case the slot timing is determined by subtracting the cyclic prefix length from the determined peak position.

Certain embodiments of the present invention will have very good performance compared to convention methods of determining cell timing. Since the correlation is performed for the entire slot at once, using FFT, the result can be obtained quickly, if an efficient FFT implementation is available.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

This application is the National Phase of PCT/JP2008/057051, filed Apr. 3, 2008, which is based upon and claims the benefit of priority from Australian provisional patent application No. 2007901835, filed on Apr. 5, 2007, the disclosure of which is incorporated herein in its entirety by reference.

The invention claimed is:

1. A method of identifying a time reference in a signal received from a transmitter of a communications network, including:
   generating a replica of a synchronization sequence on the basis of at least one known transmission parameter;
   comparing the replica of the synchronization sequence to a sequence derived from the signal received from the transmitter of the communications network to identify a reference point, as the time reference, in the signal received from the transmitter of the communications network;
   wherein:
   the signal received includes one or more signals on a plurality of subcarriers and one or more transmission parameters including:
   a pilot channel symbol position;
   a scrambling code of the signal; and
   a subcarrier map of the signal;
   wherein generating the replication of the synchronization sequence comprises:

generating a partial synchronization sequence replica for each subcarrier to be received; and combining the partial synchronization sequence replicate for each subcarrier into a single synchronization sequence replica.

2. The method of identifying the time reference in the signal received from the transmitter of the communications network according to claim 1 wherein the at least one known transmission parameter was derived from a previous communication with the communications network.

3. The method of identifying the time reference in the signal received from the transmitter of the communications network according to claim 1 wherein the step of comparing the replica of the synchronization sequence to a sequence derived from the signal received, includes, combining the replica of the synchronization sequence with the sequence derived from the signal received on a sample by sample basis to determine a peak correlation value between the sequences.

4. The method of identifying the time reference in the signal received from the transmitter of the communications network according to claim 3 wherein in the event that the peak correlation value exceeds a predetermined threshold, the method includes identifying the time position of the peak as the time reference in the signal received.

5. A method of synchronizing a receiver with the communications network, including:

identifying the time reference in the signal received from the transmitter using the method according to claim 1;

synchronizing the receiver timing with reference to the identified time reference.

6. A method, in a mobile terminal communicating with the communications network, including:

attempting to perform synchronization with the communications network in accordance with claim 5; and in the event that synchronization fails, attempting synchronization with the communications network using an alternative method.

* * * * *